(12) United States Patent
Siegfriedsen

(10) Patent No.: US 6,891,280 B2
(45) Date of Patent: May 10, 2005

(54) METHOD FOR OPERATING OFFSHORE WIND TURBINE PLANTS BASED ON THE FREQUENCY OF THEIR TOWERS

(75) Inventor: Sonke Siegfriedsen, Friedrichstadt (DE)

(73) Assignee: Aerodyn Engineering GmbH, Renosburg (DE)

( * ) Notice: Subject to any disclaimer, the term of this patent is extended or adjusted under 35 U.S.C. 154(b) by 157 days.

(21) Appl. No.: 10/240,979

(22) PCT Filed: Mar. 28, 2001

(86) PCT No.: PCT/DE01/01189
§ 371 (c)(1),
(2), (4) Date: Feb. 11, 2003

(87) PCT Pub. No.: WO01/77524
PCT Pub. Date: Oct. 18, 2001

(65) Prior Publication Data
US 2003/0151260 A1 Aug. 14, 2003

(30) Foreign Application Priority Data
Apr. 5, 2000 (DE) .......................... 100 16 912

(51) Int. Cl.$^7$ .............................. F03D 9/00; F03D 7/04; H02P 9/00; H02K 29/00
(52) U.S. Cl. .............................. 290/44; 290/51; 290/55
(58) Field of Search .............................. 290/11, 44, 51, 290/55

(56) References Cited
U.S. PATENT DOCUMENTS

| | | | | | |
|---|---|---|---|---|---|
| 4,160,170 | A | * | 7/1979 | Harner et al. | 290/44 |
| 4,161,658 | A | * | 7/1979 | Patrick | 290/44 |
| 4,180,372 | A | * | 12/1979 | Lippert, Jr. | 416/23 |
| 4,189,648 | A | * | 2/1980 | Harner | 290/44 |
| 4,193,005 | A | * | 3/1980 | Kos et al. | 290/44 |
| 4,316,698 | A | * | 2/1982 | Bertoia | 416/11 |
| 4,355,955 | A | * | 10/1982 | Kisovec | 416/23 |
| 4,420,692 | A | * | 12/1983 | Kos et al. | 290/44 |
| 4,435,647 | A | * | 3/1984 | Harner et al. | 290/44 |
| 4,449,086 | A | * | 5/1984 | Hoffmann et al. | 318/696 |
| 4,461,957 | A | * | 7/1984 | Jallen | 290/44 |
| 4,495,423 | A | * | 1/1985 | Rogers | 290/44 |
| 4,496,846 | A | * | 1/1985 | Parkins | 290/44 |
| 4,496,847 | A | * | 1/1985 | Parkins | 290/44 |
| 4,498,017 | A | * | 2/1985 | Parkins | 290/44 |
| 4,515,525 | A | * | 5/1985 | Doman | 416/11 |
| 4,700,081 | A | * | 10/1987 | Kos et al. | 290/44 |
| 4,703,189 | A | * | 10/1987 | DiValentin et al. | 290/44 |
| 4,906,060 | A | * | 3/1990 | Claude | 322/29 |
| 4,966,525 | A | * | 10/1990 | Nielsen | 416/9 |
| 5,052,890 | A | * | 10/1991 | Roberts | 416/193 A |
| 5,083,039 | A | * | 1/1992 | Richardson et al. | 290/44 |
| 5,155,375 | A | * | 10/1992 | Holley | 290/44 |
| 5,232,344 | A | * | 8/1993 | El-Aini | 416/145 |
| 5,289,041 | A | * | 2/1994 | Holley | 290/44 |
| 5,346,362 | A | * | 9/1994 | Bonner et al. | 415/191 |
| 5,369,882 | A | * | 12/1994 | Dietz et al. | 29/889.1 |
| 5,474,425 | A | * | 12/1995 | Lawlor | 416/223 R |
| 5,498,137 | A | * | 3/1996 | El-Aini et al. | 416/229 A |
| 5,629,598 | A | * | 5/1997 | Wilkerson | 318/808 |
| 5,652,485 | A | * | 7/1997 | Spiegel et al. | 318/147 |
| 6,137,187 | A | * | 10/2000 | Mikhail et al. | 290/44 |

(Continued)

Primary Examiner—Darren Schuberg
Assistant Examiner—Pedro J. Cuevas
(74) Attorney, Agent, or Firm—Larson & Larson, PA; Herbert W. Larson

(57) ABSTRACT

A method for operating a wind power plant which is provided with a device for regulating the speed of a rotor of the wind power plant. The method includes the steps of: determining the critical frequency of the respective turbine and/or turbine components, determining the speed range of the rotor in which the entire turbine and/or individual turbine components are excited in the vicinity of their critical frequencies and operation of the wind turbine plant only below and above the critical range; the latter being traversed rapidly.

10 Claims, 2 Drawing Sheets

U.S. PATENT DOCUMENTS

| | | | |
|---|---|---|---|
| 6,320,272 B1 * | 11/2001 | Lading et al. | 290/44 |
| 6,327,957 B1 * | 12/2001 | Carter, Sr. | 91/41 |
| 6,600,240 B2 * | 7/2003 | Mikhail et al. | 307/85 |
| 6,703,718 B2 * | 3/2004 | Calley et al. | 290/44 |
| 6,800,956 B2 * | 10/2004 | Bartlett | 290/55 |
| 6,809,431 B1 * | 10/2004 | Schippmann | 290/55 |
| 6,827,551 B1 * | 12/2004 | Duffy et al. | 415/119 |

* cited by examiner

METHOD FOR OPERATING OFFSHORE WIND TURBINE PLANTS BASED ON THE FREQUENCY OF THEIR TOWERS

PRIOR APPLICATIONS

This application bases priority on International Application No. PCT/DE01/01189, filed Mar. 28, 2001, which bases priority on German Application No. DE 100 16 912.0, filed Apr. 5, 2000.

BACKGROUND OF THE INVENTION

1. Field of Invention

The invention relates to a method for operating offshore wind turbine plants based on the frequency of their towers. More particularly, it relates to a method for operating offshore wind turbine plants wherein a critical natural frequency of the power plant if constantly determined, changes to a fixing strength are recognized and a forbidden resonance range threshold is correspondingly displaced.

2. Description of the Prior Art

Wind power plants, which at present are largely installed on land, are founded on foundation soil of varying strength. If the soil has an adequate bearing capacity flat foundations of concrete are adequate for static and dynamic requirements. If the surface area has inadequate bearing capacities, piles are introduced into the underlying load bearing layers in order to introduce into the soil the wind power plant loads. A deign criterion for the structural dimensioning of the tower ad foundation parts are the lowest tower natural bending frequencies.

The exciting frequencies of the rotor must in operation of the plant always have a certain spacing from the aforementioned tower natural frequencies, because otherwise there are dynamic superelevation of the structural loading leading to premature component fatigue failure. The exciting frequencies are the rotor speed and the blade multiple thereof. These dynamic superelevations as a result of resonances must be avoided, in order to achieve the intended mathematical service life of the load-transferring components of a wind power plant. Thus, through the structural dimensioning of the tower and the foundation of land-supported plants, the initial tower natural frequency is conventionally interpreted in such a way that under all operating conditions the exciting frequency must be adequately spaced from the tower natural frequencies.

In the mathematical interpretation of the necessary natural frequencies, account must be taken of the characteristics of the surrounding soil. These soil characteristics influence the rigidity of the foundation fixing and therefore the natural frequencies. In the case of land-supported supported plants in a first approximation there is no change over a period of time in the fixing rigidities of the foundation. Thus, the natural frequencies of the plant also remain roughly constant over the service life.

EP 244 341 A1 refers to the occurrence of resonances, which arise on reaching a specific rotor speed. It is proposed that this rage be avoided by rapidly passing through it.

In offshore plants anchored by one or more piles on the ocean bed, as a result of flow changes around the foundation structure, tidal currents or strong wave movements, the piles are flushed out to a greater or lesser extent.

This phenomenon, known as erosion, has the consequence of the fixing rigidity of the pile changing and, consequently, so does the tower natural frequency. In addition, the dynamics of the plant also lead to a change in the ocean bed surrounding the pile and, therefore, to a change in the natural frequency.

Moreover, in an offshore wind park, the soil conditions differ at each plant location. As the foundation parts are to have the same construction for cost reasons, the fixing rigidity and, therefore, the natural frequency differ for each plant. These changes and differences cannot be calculated in advance, are of an arbitrary nature, differ for each plant and are permanently variable over a period of time. As a result, with varying natural frequencies, the plants can be subject to superelevated operating strength loads ad premature failure occurs.

SUMMARY OF THE INVENTION

The problem of the invention is to avoid premature failure of the plant, even in the case of plants with varying natural frequencies.

According to the subject invention, this problem is solved. The critical natural frequencies of the plant are constantly determined, changes to the fixing strength are recognized and the forbidden resonance range is correspondingly displaced.

The critical natural frequency is preferably the natural bending frequency of the overall plant, but can also be the natural frequency of e.g. in particular the rotor blade.

The critical natural bending frequency is preferably permanently determined using acceleration sensors, strain gauges or path sensors.

BRIEF DESCRIPTION OF THE DRAWINGS

Further features and advantages of the present invention can be gathered from the following descriptions of the preferred embodiment with reference to the attached drawings, wherein.

DETAILED DESCRIPTION OF THE PREFERRED EMBODIMENT

Figure 1:
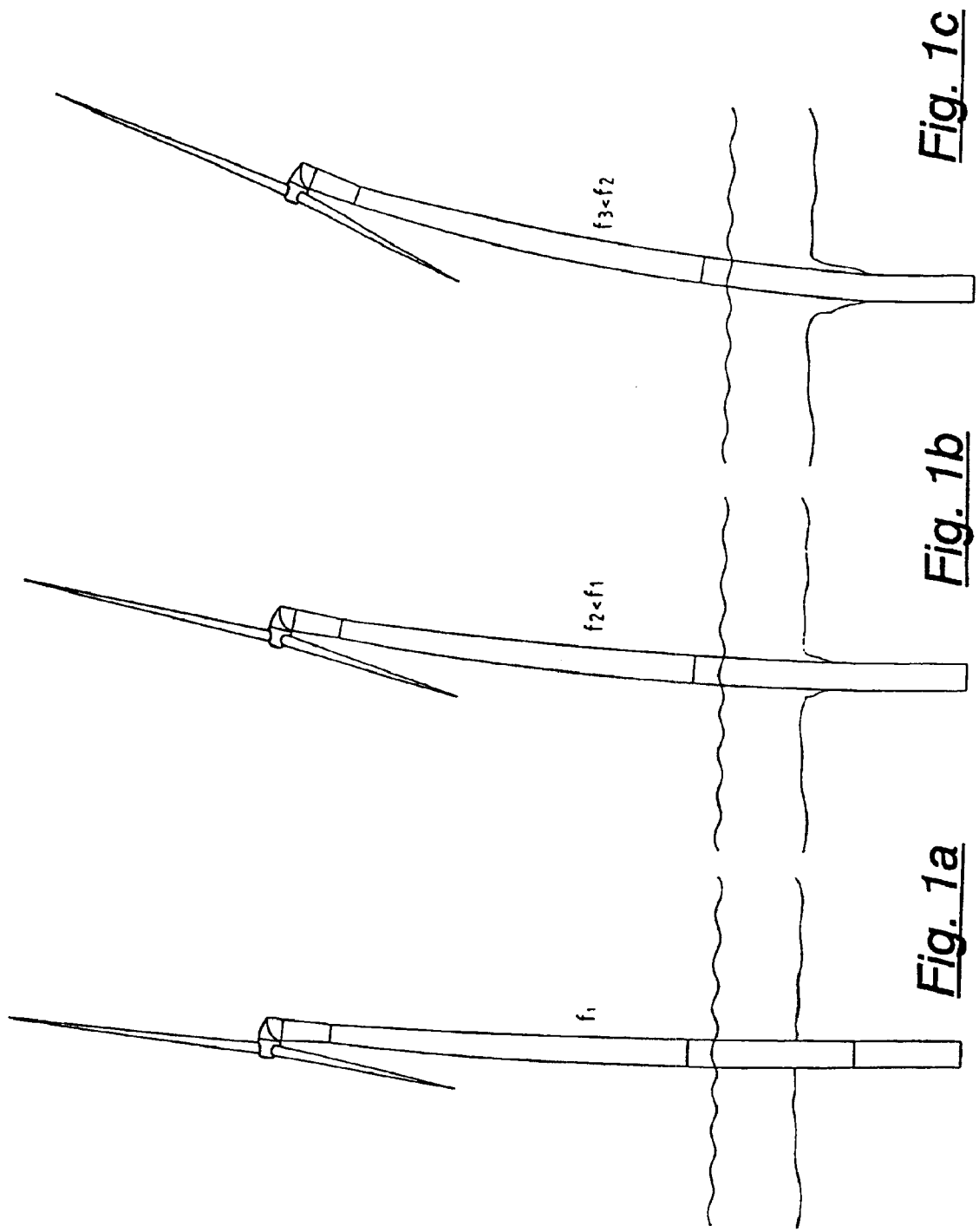
FIG. 1A shows a view of an offshore wind power plant with no foundation erosion according to the method of the invention.
FIG. 1B shows a view of the offshore wind power plant of FIG. 1A with slight foundation erosion.
FIG. 1C shows a view of the offshore wind power plant of FIG. 1A with a significant increase in foundation erosion as compared to that which is shown in FIG. 1B.

FIG. 1A shows the deflection of an offshore wind power plant, where there has been no foundation erosion.

On reaching the natural bending frequency $f_1$ there is only a relatively limited tower bending. When erosion starts (FIG. 1B) the deflection is more pronounced and the natural frequency $f_2$ is lower than the natural frequency in the case shown in FIG. 1A. In FIG. 1C the erosion is clearly greater, the natural frequency $f_3$ being lower than in the state shown in FIG. 1B, and correspondingly the deflection is greater.

Figure 2:
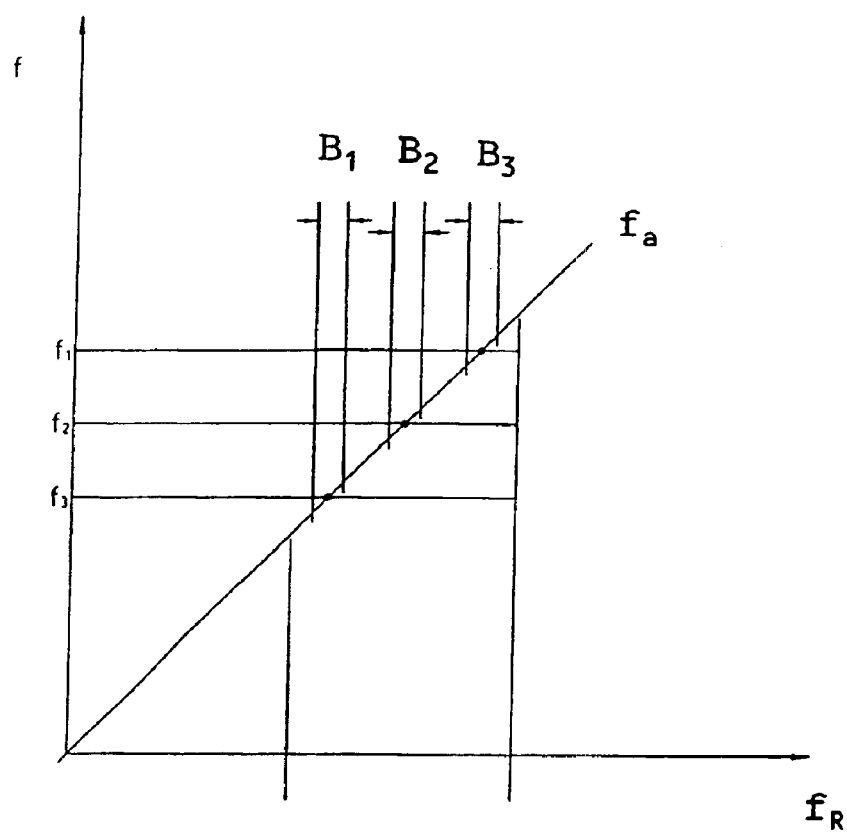
FIG. 2 depicts a graphical representation showing the exciting frequency as a function of the speed and the forbidden speed range as a function of the critical natural frequency of the plants.

FIG. 2 shows the forbidden speed ranges of a plant as a function of the varying critical natural frequencies $f_1$ and $f_2$.

To avoid the plant being operated in the resonant frequency range, the critical natural frequency of the plant is determined, as is the speed of the rotor where the plant is excited in its critical natural frequency range. This speed range is avoided during the operation of the wind power plant by operating above or below said critical speed range and, if necessary, there is a rapid passage through the critical speed range.

Figure 3:
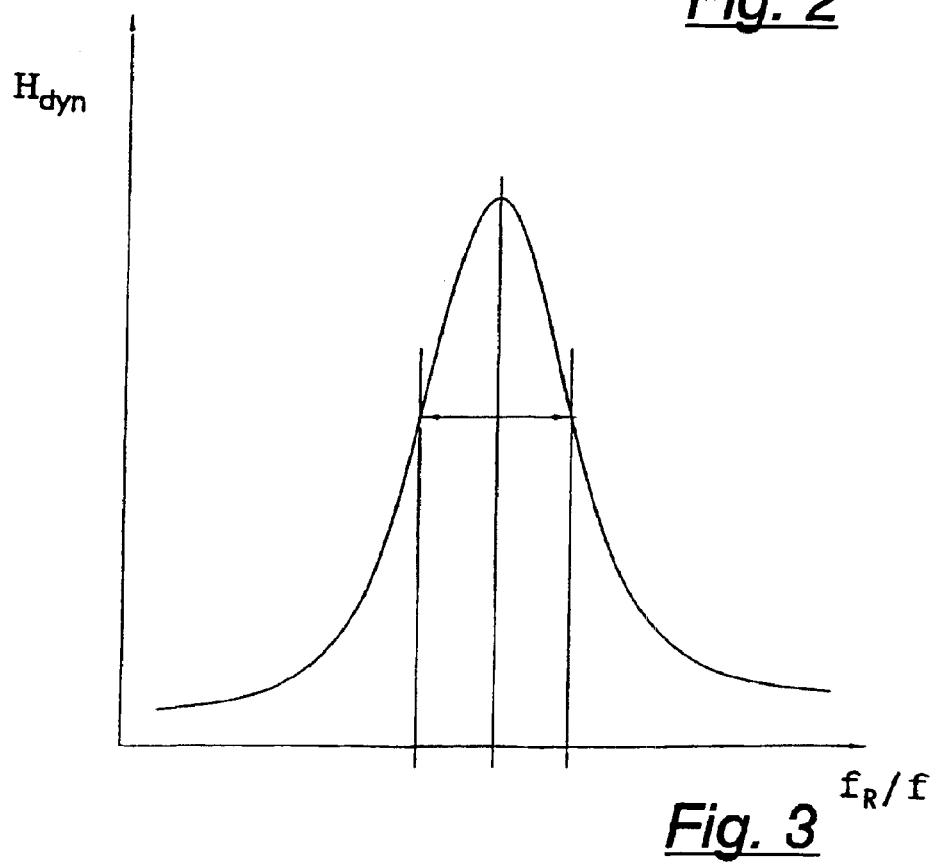
FIG. 3 depicts a graphical representation showing the dynamic superelevation as a function of the ratio of the exciting frequency to the plant natural frequency according to the method of the invention.

FIG. 3 shows the dynamic superelevation which is brought about on reaching given rotor frequencies as a ratio of the exciting frequency $f_R$ to the natural frequency f. If this ratio is close to 1, the "forbidden range" is reached and must be passed through rapidly (a superelevation of the dynamic loads by 10% leads to a 50% service life reduction).

The natural bending frequency can be determined by acceleration senors, strain gauges or path sensors. It is important that is regularly determined, because it changes over a period of time and, in particular, as a function of increasing erosion.

The critical natural frequency need not only be that of the overall plant, but also important plant parts and more, especially, rotor blades.

What is claimed is:

1. A method for operating an offshore wind power plant, the offshore wind power plant having a rotor operable at different speeds, the steps of the method comprising:
   a) providing a rotor speed regulation device and a sensor for the measurement of a frequency change over a period of time;
   b) determining in regular intervals a range of critical natural frequencies of the offshore wind power plant, the range of critical natural frequencies defining a highest threshold rotor speed by which the offshore wind power plant can operate;
   c) determining a forbidden rotor speed range defined as speeds above the highest threshold rotor speed;
   d) shifting the forbidden speed range corresponding to the critical natural frequencies regularly determined;
   e) determining a safe rotor speed range wherein there is an excitation of the offshore wind power plant in the range of critical natural frequencies; and
   f) operating the offshore wind power plant within the safe rotor speed range by constantly determining a current critical natural frequency of the offshore wind power plant and ensuring that the offshore wind power plant is not operated within the forbidden rotor speed range.

2. The method of claim 1, wherein the range of critical natural frequencies are defined as a range of natural bending frequencies of the offshore wind power plant.

3. The method of claim 2, wherein the range of natural bending frequencies are determined by a device chosen from the group consisting of acceleration sensors, strain gauges and path sensors.

4. The method of claim 1, wherein the offshore wind power plant is controlled through automatic operation.

5. The method of claim 1, wherein the offshore wind power plant is controlled by an operator.

6. A method for operating an offshore wind power plant, the offshore wind power plant having a multitude of plant parts including a rotor operable at different speeds, the steps of the method comprising:
   a) providing a rotor speed regulation device;
   b) providing a sensor for the measurement of a frequency change over a period of time;
   c) constantly determining a range of critical natural frequencies of the multitude of plant parts of the offshore wind power plant, the range of critical natural frequencies defining a highest threshold rotor speed by which the offshore wind power plant can operate;
   d) determining a forbidden rotor speed range defined as speeds above the highest threshold rotor speed;
   e) shifting the forbidden rotor speed range corresponding to the critical natural frequencies constantly being determined;
   f) determining a safe rotor speed range wherein there is an excitation of the multitude of plant parts of the offshore wind power plant in the range of critical natural frequencies; and
   g) operating the offshore wind power plant within the safe rotor speed range by constantly determining a current critical natural frequency of the multitude of plant parts of the offshore wind power plant and ensuring that the offshore wind power plant is not operated within the forbidden rotor speed range.

7. The method of claim 6, wherein the range of critical natural frequencies are defined as a range of natural bending frequencies of the offshore wind power plant.

8. The method of claim 7, wherein the range of natural bending frequencies are determined by a device chosen from the group consisting of acceleration sensors, strain gauges and path sensors.

9. The method of claim 6, wherein the offshore wind power plant is controlled through automatic operation.

10. The method of claim 6, wherein the offshore wind power plant is controlled by an operator.

* * * * *